June 27, 1967  W. D. RANSIER  3,327,730
INFLATING TIRES
Filed April 6, 1966

INVENTOR.
WILLIAM DWIGHT RANSIER
BY
ATTORNEY

United States Patent Office 3,327,730
Patented June 27, 1967

3,327,730
INFLATING TIRES
William Dwight Ransier, Cleveland, N.Y., assignor of one-half to Harvey M. Stewart, Syracuse, N.Y.
Filed Apr. 6, 1966, Ser. No. 542,708
2 Claims. (Cl. 137—498)

This invention relates to equalizing pressure between the pneumatic tires of dual wheels.

More particularly the invention contemplates a valve that is connectable between the adjacent pneumatic tires of a dual wheel to equalize the pressures within such tires, and to provide protection against loss of air pressure from either tire upon the blow out or failure of the other.

The above and other novel features of the inventions will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
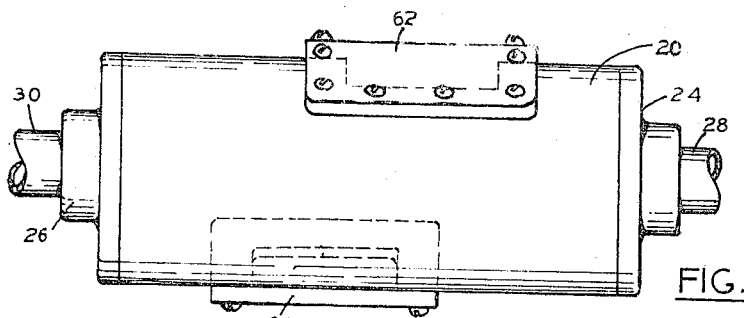
FIGURE 1 is a side elevational view of the valve.

Referring to the drawings, there is shown a valve body 20 generally in the form of a hollow cylinder and having an internal bore 22, and cylinder heads 24 and 26. Each of the heads 24 and 26 include concentric conduits 28 and 30, which are connected to the respective two pneumatic tires of a dual wheel, the conduit 28 being connected to the right hand tire or inside tire and the tube 30 being connected to the left hand tire or outside tire, for example.

Each of the conduits 28 and 30 extend coaxially into the cylinder and have an annular shoulder 32, and a thrust disk 34, slidably disposed on the conduit between the cylinder end and shoulder 32, the said disk being resiliently held against its shoulder 32 by a coil compression spring, 36 disposed around the conduit and of predetermined compression.

Slidably disposed within the cylinder, is a piston type valve element 40 having recesses 42 and 44 in its opposite ends to clear the shoulders 32 of the conduits 28 and 30, the recesses being separated by a partition 46. The valve 40 is symmetrical about the partition 46 and is provided with two external annular grooves 50 and 52, which are connected to their respective recesses 42 and 44 by a radial port such as 54 and 56. The cylinder wall is provided with slots 58 and 60, which are staggered in relation to each other, and each is closed off by a cover element such as 62 or 64.

Figure 2:
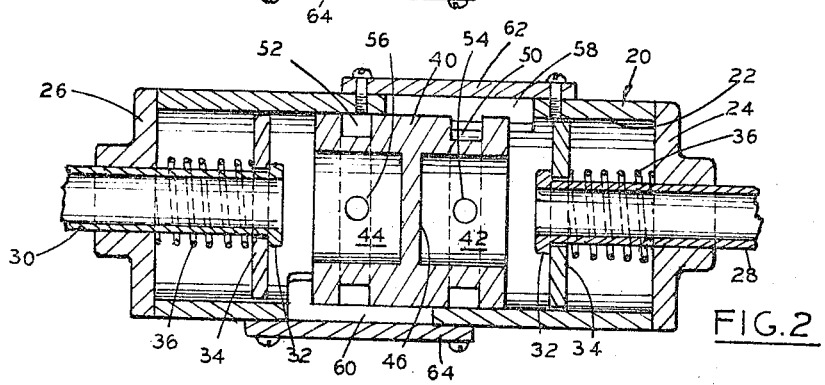
FIGURE 2 is a longitudinal section of the valve, showing the same.
Figure 3:
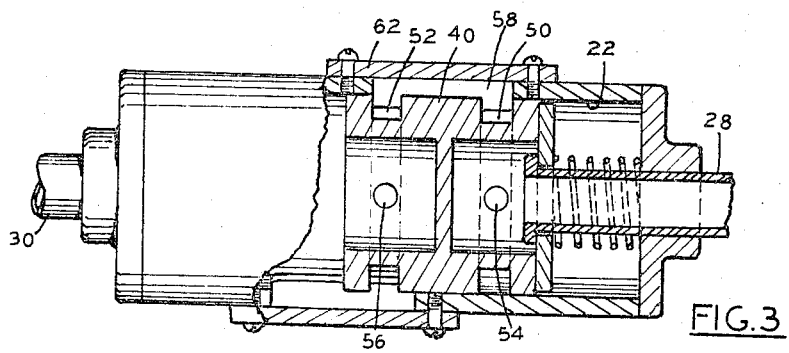
FIGURE 3 is a longitudinal section of the valve showing the valve shifted to permit equalization of pressures in between the two tires of a dual wheel.

As shown in FIGURE 2, the piston is in a central or neutral position, as would pertain in the case of the pressure of one tire being the same as the pressure of the other tire so that the pressure in the opposite ends of the valve are alike. Should pressure in one tire build up, due to greater heating of the tire as might occur in regard to the inside tire when riding on a crowned highway, the piston valve 40 is moved to the right as shown in FIGURE 3, whence air under higher pressure from the left hand tire may flow through port 56 to groove 52, slot 58 to groove 50 through port 54 to conduit 28 and to the outside right hand tire, thus equalizing the pressure between the tires.

Figure 4:
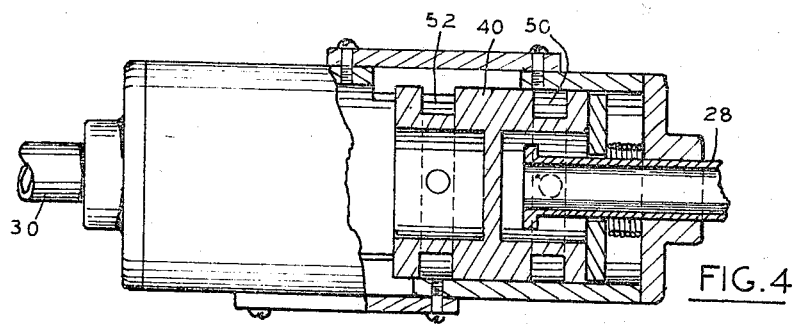
FIGURE 4 is a longitudinal section of the valve, showing the valve shifted to a position to shut off air flow from one tire to the other tire due to blowout conditions of the latter.

Should the outside right hand tire blow out, the pressure on the left hand end of the piston valve will exceed the pressure on the right hand end, sufficient to compress the spring 36, whereupon the annular groove 50 moves to the right of the slot 58, as shown in FIGURE 4, to cut off flow of air to the right hand tire thereby preserving the inflation of the left hand tire. Since the valve is essentially symmetrical, when conditions are reversed as between the tires, the operation will be the same but in the opposite direction.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An air pressure equalizer valve adapted for connection between adjacent pneumatic tires of an automotive vehicle dual wheel, comprising a valve casing having a cylindrical wall, a conduit adapted for connection to one pneumatic tire of a dual wheel leading to one end of the casing, a conduit adapted for connection to the other pneumatic tire leading to the other end of the casing, a movable valve element having limited free sliding movement within the casing and having opposite faces exposed to the pressures within the opposite ends of the casing respectively, said cylindrical wall having two like slots circumferentially spaced, one extending from a central area toward one end of the casing, and the other extending toward the other end, said slots being of sufficient length to permit air to bypass the valve element when moved in either direction from center by a difference in pressure, and within the limit of free movement and means actuated by movement of the valve element beyond the limit of free movement in response to a predetermined difference in pressure in the opposite ends of the casing for sealing off the conduit entering the casing having the lower pressure.

2. A valve in accordance with claim 2 wherein the casing comprises a hollow cylinder, and each of said conduits enter the cylinder at opposite ends coaxially with respect to the cylinder, and each extend equal distance into the cylinder, and are provided on their inner ends with an exterior annular shoulder, an apertured disk slidably mounted on each of said conduits and confined between the annular shoulder and the cylinder end, a helical compression spring disposed around each of said conduits between the disk and cylinder end, and adapted to hold each of the disks against the shoulder of their respective conduits resiliently under a predetermined pressure, and wherein the cylindrical piston valve element is freely slidable in the cylinder in the space between said disks and has recesses separated by a center dividing partition in its opposite ends of a diameter to fully clear the respective conduit shoulders, said recesses each being surrounded by an annular end face adapted to engage the respective disk, and wherein two annular grooves are formed in the exterior of said piston valve element on opposite sides of the dividing partition, each of said grooves having radial port means communicating with the corresponding recess, and the slots in the cylinder wall being of a length sufficient to embrace and connect both annular grooves of the valve element whereby when the piston element is moved from center in either direction sufficiently to locate one of the grooves in the center area, a passage is provided through one of said slots only to the other groove around said partition, to permit pressure equalization between the opposite ends of the cylinder, and whereby when said piston element moves in either direction to a position where both of said annular grooves are to one side or the other of the central area, and the piston element engages one or the other of said disks with sufficient force to compress the spring therebehind due to a predetermined pressure differential on opposite sides of the piston, the flow around the partition is cut off, and the conduit at such end is cut off from communication with the conduit at the other end for so long as the pressure differential exists.

References Cited

UNITED STATES PATENTS

| 2,121,936 | 6/1938 | Thomas | 137—503 X |
| 2,633,147 | 3/1953 | Badami | 137—503 X |

FOREIGN PATENTS

| 477,260 | 1/1953 | Italy. |

M. CARY NELSON, *Primary Examiner.*